July 10, 1934.  H. J. LOFTIS  1,965,661
RADIO APPARATUS
Filed Feb. 14, 1931
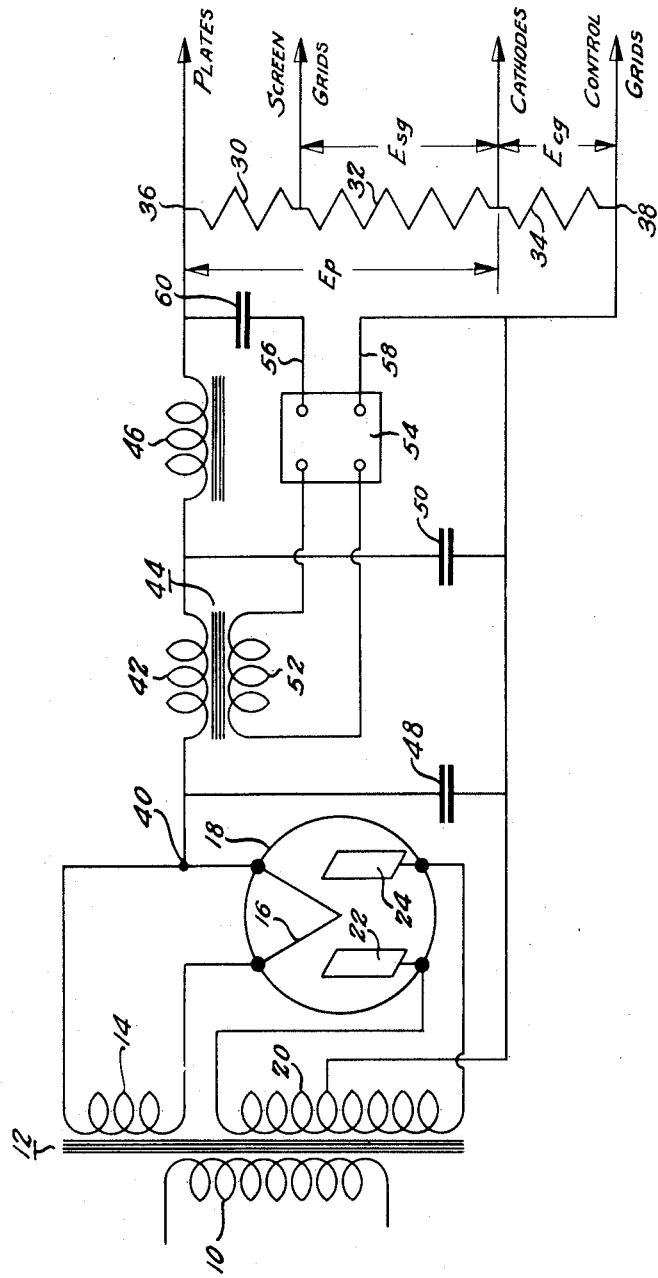
Inventor
HOMER J. LOFTIS
By Spencer, Hardman & Fehr
His Attorneys

UNITED STATES PATENT OFFICE 1,965,661

RADIO APPARATUS

Homer J. Loftis, Dayton, Ohio, assignor, by mesne assignments, to Radio Corporation of America, New York, N. Y., a corporation of Delaware Application February 14, 1931, Serial No. 515,695

4 Claims. (Cl. 178—44)

This invention relates to a device for rectifying alternating current so as to furnish a direct current that may be used in energizing a direct current load such as a radio receiver.

In the present rectifiers the output is a fluctuating continuous current that is composed of a direct current component and an alternating current component. The direct component is useful but the alternating ripple component is very undesirable and must be eliminated or suppressed.

An object of this invention is to smoothen or eliminate the alternating ripple component from the direct current component whereby hum caused by the ripple is suppressed from the output of the radio receiver. This has been accomplished by inserting a transformer having the primary in series with one of the output leads of the rectifier and the secondary windings connected to a phase shifting device which, in turn, has its terminals connected to the output terminals of said rectifier whereby an alternating current component equal and opposite to the ripple component is generated in the secondary windings and impressed upon the terminals of the rectifier so as to eliminate the A. C. ripple component found on the rectified current.

Further objects and advantages of the present invention will be apparent from the following description, reference being had to the accompanying drawing, wherein a preferred embodiment of one form of the present invention is clearly shown.

In the drawing:

The single figure discloses a schematic wiring diagram of the circuit.

The reference character 10 indicates a primary winding of a transformer 12 connected to a suitable source of alternating current. The transformer 12 is provided with a secondary winding 14 of comparatively few turns for energizing the cathode 16 of the full wave rectifier 18 and a secondary winding 20 of relatively large number of turns having one terminal connected to energize the plate 22 and the other terminal connected to energize the plate 24 of the rectifier 18.

The voltage divider including the resistances 30, 32 and 34 has been connected across the output terminals 36 and 38 of the rectifier 18. Although a voltage divider has been disclosed, any other suitable device or devices for deriving the desired voltage output may be used within the purview of this invention. In series with the lead connecting the terminal 36 to a point 40 in the cathode circuit is found the primary 42 of a transformer 44 and, if desired, a suitable choke 46. A pair of condensers 48 and 50 have been connected to each terminal of the primary winding 42 so as to form by-pass circuits for a portion of the A. C. ripple.

As it is almost impossible to completely filter the A. C. ripple from the direct current component the present device discloses a hum neutralizing means which includes the secondary winding 52 that has its terminals connected to the terminals of a phase shifting device 54 having its terminals 56 and 58 connected to the output terminals 36 and 38. In series with one lead extending from the phase shifter 54 to the terminal 36 is found a condenser 60 that prevents the direct current from flowing through the secondary winding 52 instead of energizing the load. It is evident, of course, that the condenser 60 could be placed within the phase shifting mechanism.

In order to effect complete neutralization of the ripple, the ideal solution would be to impress upon the rectified current an A. C. voltage equal to and in phase opposition to the A. C. ripple voltage bound on the rectified power source. With this solution in mind the transformer 44 has been designed to generate the desired voltage amplitude. A phase shifter 54 may be inserted in series with the leads connecting the secondary winding 52 to the terminals 36 and 38.

This phase shifter regulates the phase of the generated voltage so that the generated voltage impressed upon the terminals 36 and 38 is substantially equal to and opposite to the voltage ripple found on the rectified power source. If the phase relation existing between the generated voltage and the undesirable A. C. voltage ripple is not distorted too much, the phase shifter 54 may be eliminated.

While the form of embodiment of the present invention as herein disclosed, constitutes a preferred form, it is to be understood that other forms might be adopted, all coming within the scope of the claims which follow.

What is claimed is as follows:

1. A filter circuit for reducing ripple in a direct current supply system, including in combination, a condenser for by-passing the ripple, an auxiliary transformer, a phase shifting device, and a blocking condenser, means for neutralizing the ripple including the auxiliary transformer and phase shifting device, and means including said blocking condenser for preventing the direct current from passing through the phase shifting device.

2. A filter circuit for reducing the alternating current component from a direct current source, including in combination, condensers for by-passing the alternating current component, a choke for smoothing the direct current, an auxiliary transformer, a phase shifting device, and a blocking condenser, means including said transformer and phase shifting device for neutralizing the ripple remaining after the filtration by the choke and condensers, and means including said blocking condenser for preventing direct current from passing through the phase shifting device.

3. In a filter circuit for reducing the alternating current ripple from a direct current source, the combination including, condensers for by-passing the ripple current at different points of the circuit, a transformer, a phase shifting device, and a blocking condenser, means including said transformer for smoothing the direct current through its choke action, and means including said transformer, blocking condenser and phase shifting device for applying only a ripple neutralizing voltage between predetermined points in the circuit.

4. Means for transforming fluctuating uni-directional current into substantially pure continuous current comprising a filter circuit connected between a source of fluctuating uni-directional current and a utilizing circuit, said filter circuit including at least one choke coil in series with relation to the load circuit and one condenser in parallel with relation to the load circuit, said choke coil and condenser being arranged so as to prevent a substantial portion of the fluctuating component of said fluctuating uni-directional current from being impressed upon the load circuit, a circuit including a direct current blocking condenser, a phase shifter and a transfer coil shunted across the filter circuit said transfer coil being coupled with said choke coil so as to transfer to the choke coil an alternating current of phase and amplitude to neutralize substantially the fluctuating current component existing across the choke coil.

HOMER J. LOFTIS.